Butler & Stucker,
Bellows.

No. 92,580.      Patented July 13, 1869.

Witnesses
Geo. H. Strong.
J. L. Borne.

Inventors.
John S. Butler
Andrew J. Stucker
By their atty
Dewey & Co.

United States Patent Office.

JOHN S. BUTLER AND ANDREW J. STUCKER, OF SILVER CITY, IDAHO TERRITORY.

Letters Patent No. 92,580, dated July 13, 1869.

IMPROVEMENT IN RECIPROCATING-BELLOWS.

The Schedule referred to in these Letters Patent and making part of the same.

*To all whom it may concern:*

Be it known that we, JOHN S. BUTLER and ANDREW J. STUCKER, of Silver City, county of Owyhee, and Territory of Idaho, have invented a Reciprocating-Force Bellows; and we do hereby declare the following description and accompanying drawings are sufficient to enable any person skilled in the art or science to which it most nearly appertains, to make and use our said invention or improvement, without further invention or experiment.

Our invention relates to an improved apparatus for producing a blast of air, and can be used for any purpose where a steady and uniform current of air is desired to be introduced into a furnace, for the purpose of intensifying the heat. The device is intended more particularly for smiths' forges, foundry-blasts, and for the ventilation of mines; and It consists of two bellows operated alternately by machinery, and which serve as air-pumps for supplying the air to a reservoir from which the compressed air is ejected through an orifice or nozzle.

To more particularly describe our invention, we refer to the annexed drawings, forming a part of this specification, of which—

Similar letters of reference in each of the figures indicate like parts.

Figure 1:
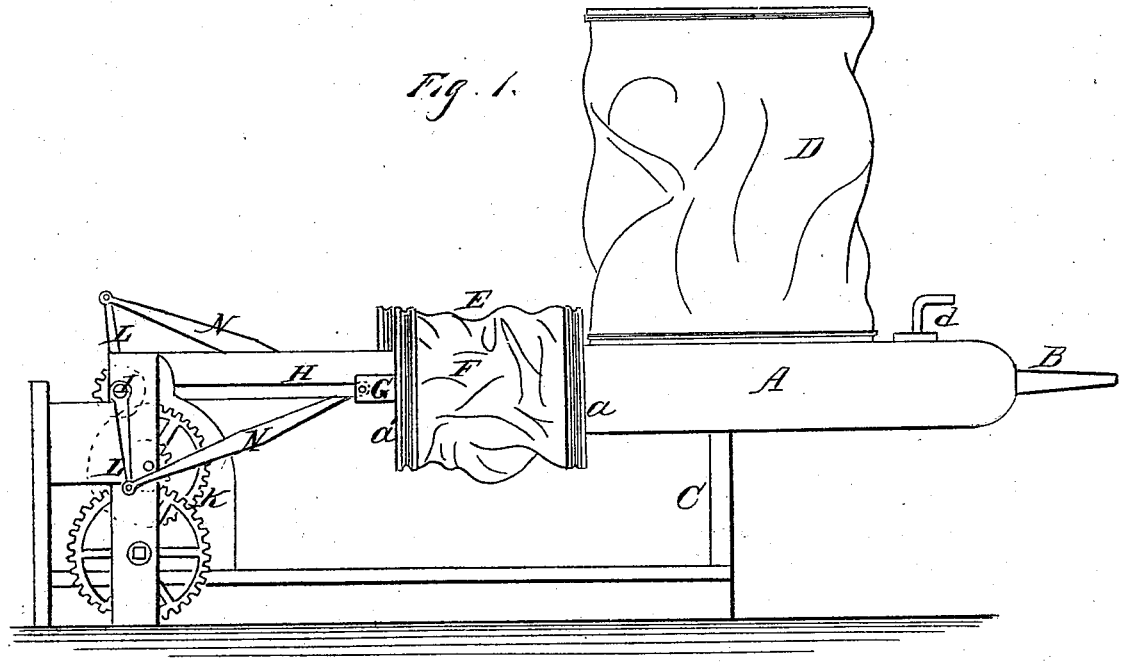
Figure 1 is a side elevation of the apparatus, with the side of the box removed.
Figure 2:
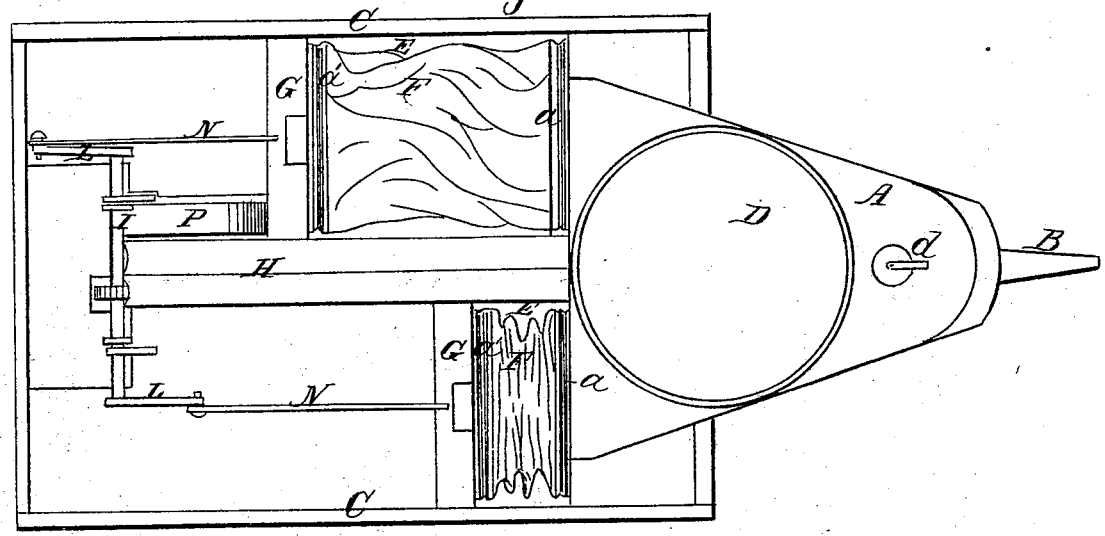
Figure 2 is a plan.

A is an air-chamber, made wide at one end, and having its sides converging towards the opposite end, to which is affixed a nozzle, B, similar to the nozzle employed on a common pair of bellows.

The chamber A is placed on a box, C, or other suitable frame, and has placed upon its top the flexible reservoir or bellows D.

This reservoir can be made circular, as represented, or of any other suitable form, and is made perfectly air-tight; the top of the chamber A being cut away beneath it to allow the air to pass from the chamber into the reservoir.

Air is supplied to the chamber and reservoir by two horizontal air-pumps or bellows E E, attached to the wide end of the chamber, one on each side.

Each of these bellows consists of two solid ends, $a\ a'$, united by some light and flexible substance or material F F.

The ends $a'$ of the two bellows have attached to them the slides G G, which move in ways in the sides of the box or frame, and in a partition, H, inside the box.

Each end of the bellows is provided with an opening, and is closed by a tight valve, which permits the air to pass in, but prevents its return.

The two bellows E E are operated by a spring, P, and a train of gear-wheels, shown at K, which causes the shaft I to revolve.

This shaft has at each end the cranks L, which are connected with the slides G by the pitmen N, thus giving to the two bellows an alternate action, which forces a steady stream of air into the chamber A and reservoir D.

At $d$ is a lever, which operates a throttle-valve in the nozzle B, for the purpose of shutting off the blast, and which, when closed, will cause the machine to stop in case everything is air-tight.

The bellows E E may be operated by weights instead of the spring, and in most cases they will be preferable; but when the spring is used, the crank-shaft should have a balance-wheel, in order to equalize the motion when passing over the centre.

By this arrangement we can get up a blast, with a regular and uniform pressure, at much less expense of power than can be accomplished by the ordinary fan-blower, as the power is only applied to the air actually used, and there is no dead weight or back-action to contend with.

The machine may be operated by any convenient or suitable power.

Having thus described our invention,

What we claim, and desire to secure by Letters Patent, is—

1. The combination, with the chamber A, provided with the reservoir D, of the alternately-acting pumps or bellows E E, substantially as and for the purpose described.

2. The arrangement, with reference to each other, of the several parts of the improved blowing-apparatus above described, substantially as set forth.

In witness whereof, we have hereunto set our hands and seals.

JOHN S. BUTLER. [L. S.]
ANDREW J. STUCKER. [L. S.]

Witnesses:
H. H. KNAPP,
H. E. LESLIE.